(12) United States Patent  (10) Patent No.: US 8,741,247 B2
Bedell  (45) Date of Patent: Jun. 3, 2014

(54) METHOD AND SYSTEM FOR LOW ENERGY CARBON DIOXIDE REMOVAL

(75) Inventor: Stephen Alan Bedell, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/560,346

(22) Filed: Jul. 27, 2012

(65) Prior Publication Data
US 2013/0259784 A1 Oct. 3, 2013

Related U.S. Application Data

(60) Provisional application No. 61/616,111, filed on Mar. 27, 2012.

(51) Int. Cl.
B01D 53/62 (2006.01)

(52) U.S. Cl.
USPC .......................................... 423/228

(58) Field of Classification Search
USPC ................. 423/228; 422/168; 252/184, 189
See application file for complete search history.

(56) References Cited

U.S. PATENT DOCUMENTS

| 3,161,461 | A | * | 12/1964 | Deal, Jr. et al. | ............... 423/228 |
| 3,563,696 | A | | 2/1971 | Benson | |
| 3,823,222 | A | | 7/1974 | Benson | |
| 3,896,212 | A | | 7/1975 | Eickmeyer | |
| 4,112,052 | A | * | 9/1978 | Sartori et al. | ................. 423/228 |
| 4,160,810 | A | | 7/1979 | Benson et al. | |
| 4,502,872 | A | | 3/1985 | Ivester et al. | |
| 4,668,255 | A | | 5/1987 | Govind | |
| 5,660,049 | A | | 8/1997 | Erickson | |
| 5,876,488 | A | | 3/1999 | Birbara et al. | |
| 6,146,605 | A | | 11/2000 | Spokoyny | |
| 6,547,854 | B1 | | 4/2003 | Gray et al. | |
| 6,755,892 | B2 | | 6/2004 | Nalette et al. | |
| 6,759,358 | B2 | | 7/2004 | Huang et al. | |
| 6,908,497 | B1 | | 6/2005 | Sirwardane | |
| 7,842,126 | B1 | | 11/2010 | Dilmore et al. | |
| 7,938,887 | B2 | * | 5/2011 | Rochelle et al. | ................. 95/159 |
| 2001/0022952 | A1 | * | 9/2001 | Rau et al. | ...................... 422/169 |
| 2006/0204425 | A1 | | 9/2006 | Kamijo et al. | |

(Continued)

FOREIGN PATENT DOCUMENTS

EP 162536 A1 11/1981
EP 1145755 A1 10/2001

(Continued)

OTHER PUBLICATIONS

Gray, M.L. et al; "CO2 Capture by Amine-Enriched Fly Ash Carbon Sorbents"; Separation and Purification Technology 35; 2004; pp. 31-36.

(Continued)

Primary Examiner — Timothy Vanoy
(74) Attorney, Agent, or Firm — Cynthia W. Flanigan

(57) ABSTRACT

A system and method for removing carbon dioxide from a gas stream. One aspect of the method includes introducing a carbon dioxide containing gas stream to an absorber; contacting the gas stream with an amine-containing solvent; absorbing, with the amine-containing solvent, the carbon dioxide from the gas stream, thereby removing the carbon dioxide from the gas stream; and forming a precipitate with the amine-containing solvent and the carbon dioxide.

16 Claims, 4 Drawing Sheets

(56) References Cited

U.S. PATENT DOCUMENTS

| | | |
|---|---|---|
| 2007/0249859 A1 | 10/2007 | Bohm et al. |
| 2010/0061904 A1* | 3/2010 | Lund et al. .................. 423/229 |
| 2011/0195005 A1 | 8/2011 | Hooper et al. |
| 2011/0195055 A1 | 8/2011 | Greenberger et al. |

FOREIGN PATENT DOCUMENTS

| | | |
|---|---|---|
| EP | 1695756 A1 | 8/2006 |
| JP | 15517279 | 12/1979 |
| JP | 192381 | 1/1981 |
| JP | 4122472 A | 4/1992 |
| JP | 2006232596 A | 9/2006 |
| WO | 9709112 | 3/1997 |
| WO | 0213948 A2 | 2/2002 |
| WO | 2005009592 A1 | 2/2005 |
| WO | 2007019632 A1 | 2/2007 |
| WO | 2008140788 A1 | 11/2008 |
| WO | 2009087060 A2 | 7/2009 |
| WO | 2009087210 A2 | 7/2009 |

OTHER PUBLICATIONS

Edfeldt, Johan; "Evaluation of New Amine Based Systems for Carbon Dioxide Absorption" Department of Chemical Engineering, Lund University, Lund, Sweden. pp. 1-7.

* cited by examiner

METHOD AND SYSTEM FOR LOW ENERGY CARBON DIOXIDE REMOVAL

CROSS-REFERENCE TO RELATED APPLICATION

The present application claims the benefit under 35 U.S.C. §119 (e) of the Provisional Patent Application Ser. No. 61/616,111 filed Mar. 27, 2012, the disclosure of which is incorporated herein by reference in its entirety.

FIELD

The present disclosure is generally directed to the removal of carbon dioxide from a gas stream. More particularly, the present disclosure is directed to a system and method for reducing an amount of energy required in removing carbon dioxide from a gas stream.

BACKGROUND

Combustion of fossil fuels typically produces an exhaust gas stream (commonly referred to as a "flue gas stream") that contains contaminants, such as carbon dioxide ($CO_2$), sulfur oxides (SOx), nitrogen oxides (NOx), mercury, and carbon containing species, as well as particulate matter such as dust or fly ash. To meet requirements established under certain laws and protocols, plants that burn fossil fuels subject the resultant flue gas stream to various processes and systems to reduce or eliminate the amount of contaminants present in the flue gas stream prior to releasing the flue gas stream to the atmosphere.

In one example, carbon dioxide is removed from a gas stream by introducing the gas stream to an absorber column ("absorber") in a counter current flow with a solvent. Contact between the solvent and the gas stream allows the solvent to absorb and thus remove the carbon dioxide from the gas stream. The gas stream that is free of the carbon dioxide may be further processed while the carbon dioxide rich solvent is regenerated for further use in the absorber tower.

When using reactive solvents, such as amines, ammonia, ionic liquids, alkali carbonates, etc., for carbon dioxide removal, the solution reactions between the solvents and the carbon dioxide are usually exothermic. Exothermic heat of reaction cannot be eliminated from the carbon dioxide removal process and efficient carbon dioxide removal is inherently accompanied by an exothermic reaction. Even though the amount of heat generated in the removal of the carbon dioxide is equal to the heat which must be added to the regenerator for breaking the bonds and freeing the carbon dioxide from the solvent, much of the heat generated by the exothermic reaction is lost, for example, by being carried out of the absorber by the gas stream. Additionally, the increase in the temperature within the solvent acts to reduce the equilibrium solubility of carbon dioxide, and hence, reduces removal capacity in the absorber. Interstage cooling has been employed to minimize these effects.

A disadvantage of known methods and devices that have been used to reduce the temperature in the absorber and the energy used in the absorption and regeneration system is that these methods often require reconfiguration of the absorber, expenditure of capital, and plant shut-down. Additionally, previously developed and used systems have not taken full advantage of the heat energy created in the absorber.

SUMMARY

According to aspects illustrated herein, there is provided a method for removing carbon dioxide from a gas stream in a substantially isothermal absorber, the method comprising: introducing a carbon dioxide containing gas stream to an absorber; contacting the gas stream with an amine-containing solvent; absorbing the carbon dioxide from the gas stream with the amine-containing solvent, thereby removing the carbon dioxide from the gas stream in an exothermic reaction; and forming a precipitate with the amine-containing solvent and the carbon dioxide, the formation of the precipitate is an endothermic reaction such that the endothermicity of the reaction reduces the exothermicity of the absorption of the carbon dioxide.

According to further aspects illustrated herein, there is provided a method for regulating an amount of heat generated in an absorber, the method comprising: introducing a carbon dioxide containing gas stream to an absorber; contacting the carbon dioxide containing gas stream with an amine-containing solvent, thereby removing carbon dioxide from the gas stream and forming a precipitate between the carbon dioxide and the amine-containing solvent; and adjusting the degree of precipitation formation by at least one of decreasing a temperature of the absorber, combining a co-solvent with the amine-containing solvent, or increasing a concentration of carbon dioxide present in the absorber, wherein the degree of precipitation formation regulates an amount of heat generated in the absorber.

In yet a further aspect illustrated herein, there is provided a system for removing carbon dioxide from a gas stream, the system comprising: an absorber configured to receive a carbon dioxide containing gas stream and an amine-containing solvent, wherein the carbon dioxide containing gas stream and the amine-containing solvent are contacted to remove carbon dioxide from the gas stream in an exothermic reaction and form a precipitate in an endothermic reaction, the endothermic reaction having an endothermicity that reduces the exothermicity of the removal of the carbon dioxide; and a regenerator fluidly coupled to the absorber, wherein the regenerator is configured to receive at least a portion of the precipitate and remove carbon dioxide therefrom to form a regenerated solvent to be introduced to the absorber for further absorption and removal of carbon dioxide.

The above described and other features are exemplified by the following figures and in the detailed description.

BRIEF DESCRIPTION OF THE DRAWINGS

Referring now to the figures which are exemplary embodiments and wherein like elements are numbered alike.

DETAILED DESCRIPTION

Figure 1:
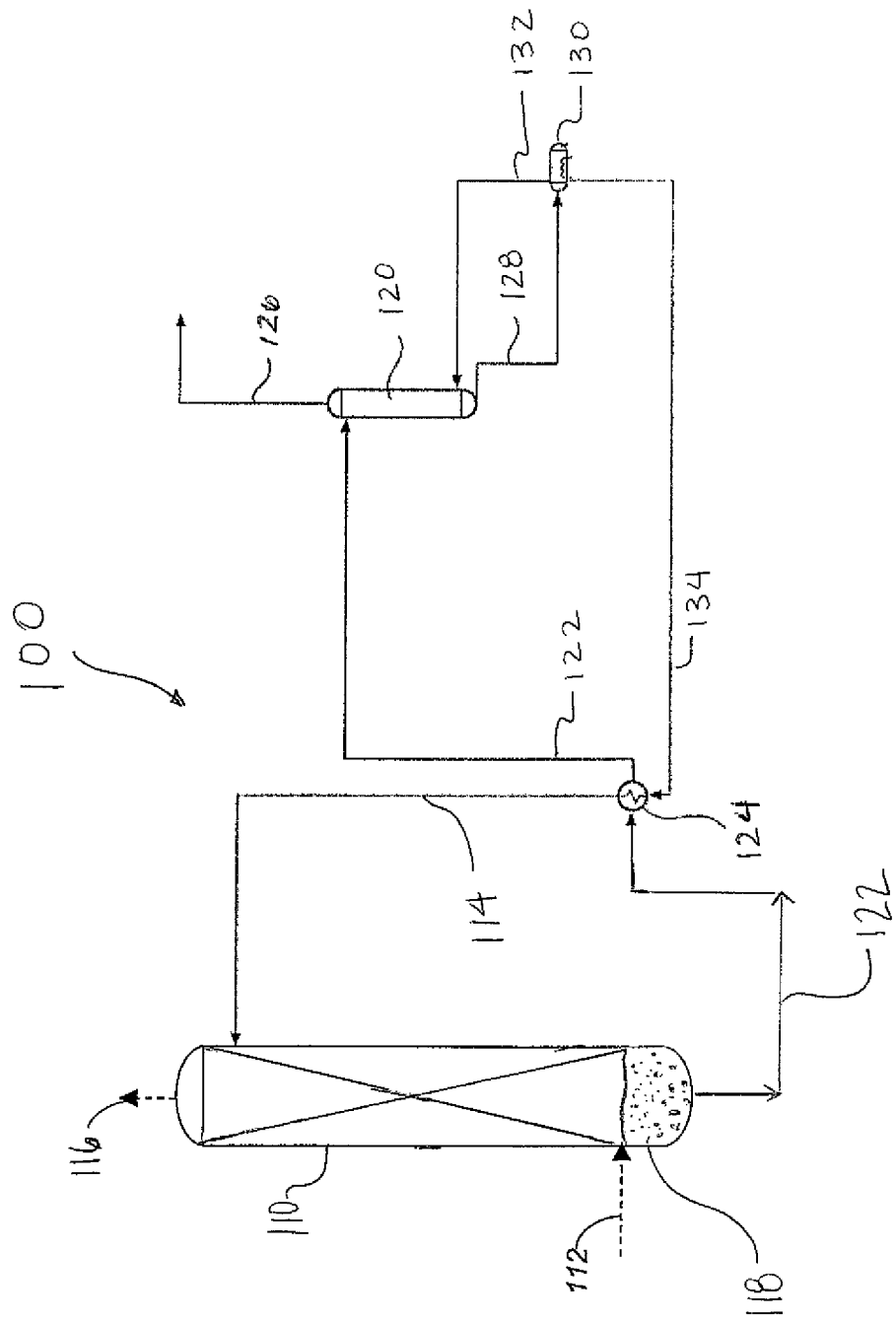
FIG. 1 is a schematic depiction of a system for removal of carbon dioxide from a gas stream.

FIG. 1 illustrates a system 100 for removal of carbon dioxide ($CO_2$) from a gas stream. The system 100 includes an absorber column (absorber) 110, wherein a carbon dioxide containing gas stream (e.g., a flue gas stream) 112 is introduced and contacted with a solvent 114. The carbon dioxide containing gas stream 112 may be contacted with the solvent 114 in a countercurrent manner, however it is contemplated that the carbon dioxide containing gas stream 112 may be contact with the solvent 114 in any manner or direction that is desired in the system 100.

When the carbon dioxide containing gas stream 112 is contacted with the solvent 114, the carbon dioxide is absorbed from the gas stream, thereby producing a stream 116 that is substantially reduced in carbon dioxide content. The stream 116 having a substantially reduced carbon dioxide content may be subjected to further processing in another portion of the system 100 (not shown) or may be released to an environment.

The reaction between the carbon dioxide and the solvent 114 in the absorber 110 is an exothermic reaction. Therefore, the reaction in the absorber 110 generates heat that may escape from the absorber with the gas stream 116. It has been found that the heat generated from the reaction between the carbon dioxide and the solvent 114 decreases the efficiency of carbon dioxide removal. However, the inventor has now surprisingly found that the exothermic nature of the solution reaction between the carbon dioxide and the solvent 114 can be tempered by forming a precipitate 118 between the carbon dioxide and the solvent in a reaction step that is endothermic (i.e., has "endothermicity") in nature.

The precipitate 118 is formed when the carbon dioxide in the gas stream 112 is contacted with the solvent 114 in the absorber 110. In one embodiment, the endothermicity of the reaction that forms the precipitate reduces the exothermicity of the reaction between the carbon dioxide and the solvent 114. For instance, the endothermicity of the reaction that forms the precipitate is equal to the exothermicity of the reaction between the carbon dioxide and the solvent 114, thus resulting in an isothermal absorber 110. An isothermal absorber may facilitate maximum carbon dioxide removal efficiency.

Formation of the precipitate 118 includes contacting a solvent 114 that is an amine-containing solvent, with the carbon dioxide in the carbon dioxide containing gas stream 112. The amine-containing solvent 114 includes an amine compound that reacts with carbon dioxide and has a positive heat of crystallization (also referred to as a negative heat of solution). The positive heat of crystallization allows the precipitate 118 to absorb heat generated during the removal of carbon dioxide from the gas stream. Absorption of the heat that is generated during the removal of carbon dioxide increases the efficiency of carbon dioxide removal. Additionally, absorption of the heat may decrease the amount of energy needed to regenerate the solvent 114 in a regenerator 120 since the dissolution of the precipitate 118 will supply heat to the regenerator 120, thereby releasing carbon dioxide from the solvent 114 and thus regenerating the solvent.

In one embodiment, the amine-containing solvent 114 is in an aqueous solution; however it is contemplated that the amine-containing solvent may be in a non-aqueous solution, which may foster precipitation. The amine compound(s) utilized in the amine-containing solvent 114 may be a diamine, a triamine, a cyclic amine, an amino acid, or a combination thereof. In one embodiment, the amine compound forms a bicarbonate salt or a carbamate salt. In a particular example, the amine-containing solvent is 2-amino-2-methyl-1-propanol in an aqueous solution.

Other examples of the amine compound include, but are not limited to, N-ethyldiethanolamine (2-[ethyl-(2-hydroxyethyl)-amino]-ethanol, EDEA), 2-(dimethylamino)-ethanol (N,N-dimethylaminoethanol, DMEA), 2-(diethylamino)-ethanol (N,N-diethylethanolamine, DEEA), 3-(dimethylamino)-1-propanol (DMAP), 3-(diethylamino)-1-propanol, 1-(dimethylamino)-2-propanol (N,N-dimethylisopropanolamine), and 2-(diisopropylamino)-ethanol (N,N-diisopropylethanolamine).

Examples of cyclic amine compounds include, but are not limited to triethylenediamine, 1-hydroxyethylpiperidine, 2-hydroxyethylpiperidine, bis(hydroxyethyl)piperazine, N,N'-dimethylpiperazine, 2,5-dimethylpiperazine, 2,4,6-trimethyl-[1,3,5]triazinane, 1-methyl-2-pyrrolidineethanol, piperazine, homopiperazine, 1-hydroxyethylpiperazine, 4-hydroxyethylpiperazine, 1-methylpiperazine, and 2-methylpiperazine.

In one embodiment, the amount of precipitate 118 that is formed (also referred to as the "degree of precipitation") in the absorber 110 is adjustable. The ability to adjust the degree of precipitation allows a user to regulate or control the amount of heat that is generated and released when the carbon dioxide is removed from the gas stream 112. The adjustability of the degree of precipitation also allows the user the ability to adjust the heat of the precipitation reaction to match the magnitude of the heat of the carbon dioxide removal reaction. For example, if an entire amount of amine-containing solvent 114, such as amine containing bicarbonate salt or carbamate salt, is precipitated it will provide the maximum sensible heating reduction for the absorber 110; however, the solution in the absorber 110 may become too cool, resulting in slow reaction kinetics and inefficient absorption of the carbon dioxide from the gas stream 112.

Adjusting the degree of precipitation can be accomplished in one or more ways. In one embodiment, precipitation may be enhanced (i.e., increased) by lowering the temperature of the absorber 110 to a temperature between about 5° C. to about 50° C. In another embodiment, the degree of precipitation may be enhanced by combining the amine-containing solvent 114 with a co-solvent. Examples of co-solvents are well known and include any co-solvent that is miscible with water and causes precipitation, such as, for example, ethanol, methanol and acetone. In another embodiment, the degree of precipitation may be enhanced by increasing a concentration of carbon dioxide present in the absorber 110.

Figure 2:
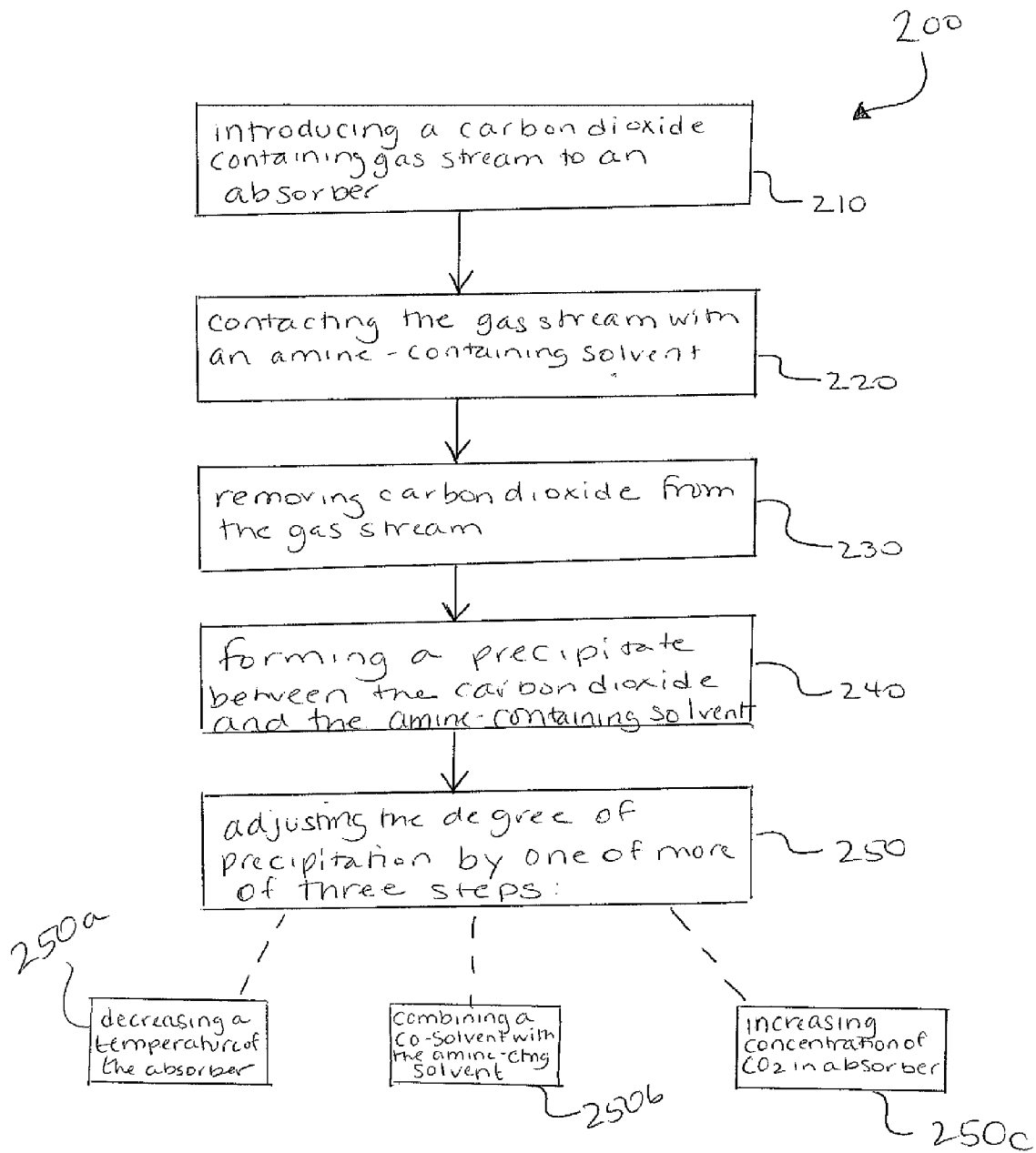
FIG. 2 is a flowchart illustrating a method for regulating a degree of precipitation.

A method 200 for adjusting the degree of precipitation and consequently, regulating an amount of heat generated in the absorber 110, is illustrated in FIG. 2. As shown in FIG. 2, in step 210 the carbon dioxide containing gas stream 112 is introduced to the absorber 110. In steps 220 and 230 the gas stream 112 is contacted with the amine-containing solvent 114 and the carbon dioxide is removed from the gas stream. A precipitate is formed between the carbon dioxide and the amine-containing solvent 114 in step 240. A user can adjust the degree of precipitation in step 250 by one or more of the following steps: decreasing a temperature of the absorber 110 in step 250a; combining a co-solvent with the amine-containing solvent 114 in step 250b; and increasing the concentration of the carbon dioxide in the absorber 110 in step 250c.

While not shown in FIG. 2, to decrease an amount of precipitate 118 that is formed in the absorber 110, a user can increase the temperature of the absorber 110 to a temperature that provides for the proper balance between the exothermic and endothermic reactions, decreasing the concentration of carbon dioxide present in the absorber, or utilizing an amine-containing solvent 114 that does not include a co-solvent.

Turning back to FIG. 1, after the precipitate 118 is formed in the absorber 110 it is removed from the absorber as a slurry via line 122 and provided to the regenerator 120. As shown in FIG. 1, prior to introduction of the slurry to the regenerator 120, it is heated via a heat exchanger 124. While not shown in FIG. 1, it is contemplated that the system 100 includes one or more pumps that facilitates the movement of the slurry.

Figure 1A:
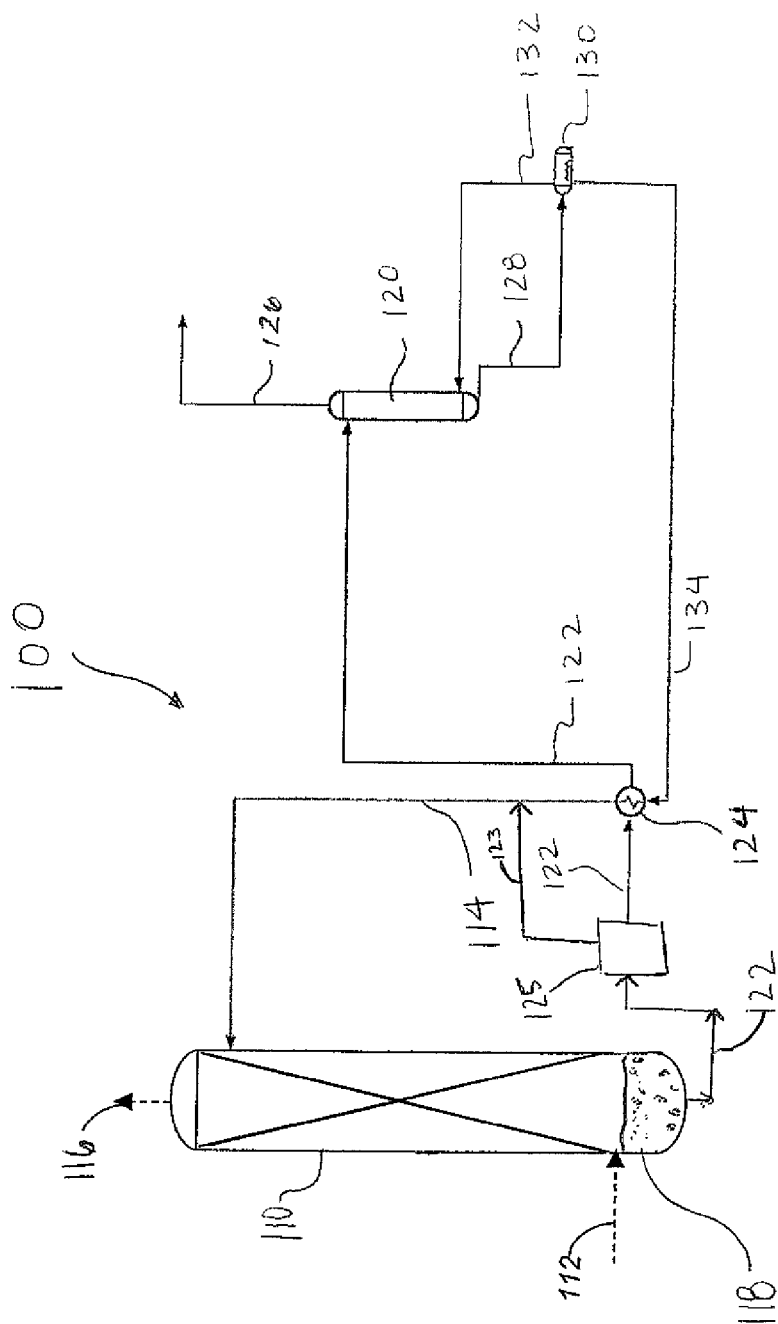
FIG. 1a is a schematic depiction of a system for removal of carbon dioxide from a gas stream.

In one embodiment, as shown in FIG. 1a, the slurry is provided to a separation vessel 125, which separates the solids from the liquids of the slurry and provides the solids (essentially, a thick slurry) to the heat exchanger 124 via the line 122. The liquid, i.e., the supernatant, is drawn off the separation vessel 125 and recycled via line 123 to the amine-containing solvent 114.

In the regenerator 120, the slurry is stripped of carbon dioxide by breaking the chemical bond between the carbon dioxide and the solvent. Typically, the carbon dioxide is removed from the solvent by the introduction of heat to the regenerator 120.

After being stripped from the solvent, the carbon dioxide is released from the regenerator 120 as a stream of carbon dioxide 126. The stream of carbon dioxide 126 is sent to another section of the system 100 for further processing, storage or use, while the regenerated solvent leaves the regenerator bottom via line 128. The regenerated solvent is passed to a reboiler 130 via the line 128. While not shown in FIG. 1, it is contemplated that the system 100 may include one or pumps that facilitate the movement of the regenerated solvent throughout the system.

In the reboiler, located at the bottom of the regenerator 120, the regenerated solvent is boiled to generate vapor 132, which is returned to the regenerator 120 to drive separation of carbon dioxide from the solvent. In addition, reboiling of the regenerated solvent may provide further carbon dioxide removal from the regenerated solvent.

Following reboiling, the reboiled and thus heated solvent is passed to the heat exchanger 124 via line 134 for heat-exchanging with the used solvent from the absorber 110. Heat-exchanging allows for heat transfer between the solutions, resulting in a cooled reboiled solvent and a heated used slurry. The reboiled and heat-exchanged solvent is thereafter passed to the next round of absorption in the absorber. While not shown in FIG. 1, it is contemplated that the solvent may be cooled in a cooler prior to being introduced to the absorber 110.

Figure 3:
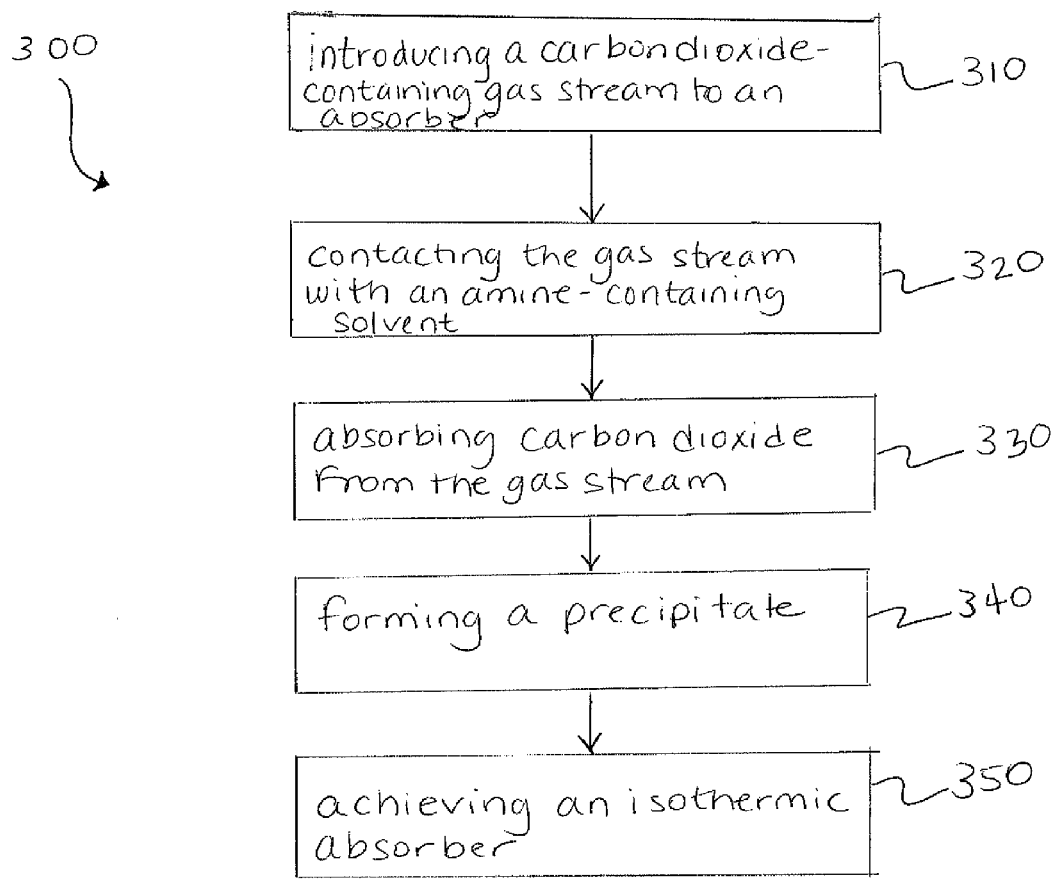
FIG. 3 is a flowchart illustrating a method for removing carbon dioxide from a carbon dioxide containing gas stream.

A flowchart illustrating a method 300 for forming the precipitate is shown in FIG. 3. Method 300 includes a step 310 of introducing the carbon dioxide containing gas stream 112 to the absorber 110. In step 320, the carbon dioxide containing gas stream 112 is contacted with an amine-containing solvent 114 such that the carbon dioxide is absorber from the gas stream, as shown in step 330. After the carbon dioxide is absorbed from the gas stream 112, in step 340, a precipitate 118 is formed between the carbon dioxide and the amine-containing solvent 114.

The endothermic nature of the precipitate 118 that is formed in the absorber 110 allows the absorber 110 to be isothermal, thereby increasing the efficiency of carbon dioxide removal while also reducing an amount of energy (heat) needed to regenerate the solvent used for removing the carbon dioxide.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or matter to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for removing carbon dioxide from a gas stream in a substantially isothermal absorber, the method comprising:
    introducing a carbon dioxide containing gas stream to an absorber;
    contacting the gas stream with an amine-containing solvent;
    absorbing the carbon dioxide from the gas stream with the amine-containing solvent, thereby removing the carbon dioxide from the gas stream in an exothermic reaction; and
    forming a precipitate with the amine-containing solvent and the carbon dioxide, the formation of the precipitate is an endothermic reaction such that the endothermicity of the reaction reduces the exothermicity of the absorption of the carbon dioxide.

2. A method according to claim 1, wherein the formation of the precipitate is an endothermic reaction such that the endothermicity of the reaction is substantially equal to the exothermicity of the absorption of the carbon dioxide thereby resulting in a substantially isothermal absorber.

3. A method according to claim 1, wherein the amine-containing solvent comprises an amine compound that reacts with carbon dioxide and has a positive heat of crystallization, the amine compound selected from the group consisting of diamines, triamines, cyclic amines, amino acids, and a combination thereof.

4. A method according to claim 3, wherein the amine compound forms a bicarbonate salt or a carbamate salt.

5. A method according to claim 3, wherein the amine-containing solvent comprises 2-amino-2-methyl-1-propanol in an aqueous solution.

6. A method according to claim 1, further comprising:
    adjusting a degree of precipitation by lowering the temperature of the absorber to a temperature between about 5° C. to about 50° C.

7. A method according to claim 1, further comprising:
    adjusting a degree of precipitation by combining the amine-containing solvent with a co-solvent.

8. A method according to claim 7, wherein the co-solvent is selected from the group consisting of ethanol, methanol and acetone.

9. A method according to claim 1, further comprising:
    adjusting a degree of precipitation by increasing a concentration of carbon dioxide present in the absorber.

10. A method according to claim 1, further comprising:
    removing the precipitate from the absorber as a slurry; and
    providing at least a portion of the slurry to a regeneration system for separating the carbon dioxide from the amine-containing solvent.

11. A method for regulating an amount of heat generated in an absorber, the method comprising:
    introducing a carbon dioxide containing gas stream to an absorber;
    contacting the carbon dioxide containing gas stream with an amine-containing solvent, thereby removing carbon dioxide from the gas stream and forming a precipitate between the carbon dioxide and the amine-containing solvent; and
    adjusting the degree of precipitation formation by at least one of decreasing a temperature of the absorber, combining a co-solvent with the amine-containing solvent, or increasing a concentration of carbon dioxide present in the absorber, wherein the degree of precipitation formation regulates an amount of heat generated in the absorber.

12. A method according to claim 11, wherein the amine-containing solvent comprises an amine that reacts with carbon dioxide, the amine selected from the group consisting of diamines, triamines, cyclic amines, amino acids, and a combination thereof.

13. A method according to claim 12, wherein the amine forms a bicarbonate salt or a carbamate salt.

14. A method according to claim 12, wherein the amine-containing solvent comprises 2-amino-2-methyl-1-propanol in an aqueous solution.

15. A method according to claim 11, wherein the amine-containing solvent comprises a positive heat of crystallization such that when the precipitate is formed, the precipitates absorbs heat generated during the removal of carbon dioxide from the gas stream.

16. A method according to claim 11, wherein when the temperature of the absorber is decreased to a temperature between about 5° C. to about 50° C.

* * * * *